L. R. FAUGHT.
CAR-AXLE BOX.
No. 169,975.   Patented Nov. 16, 1875.
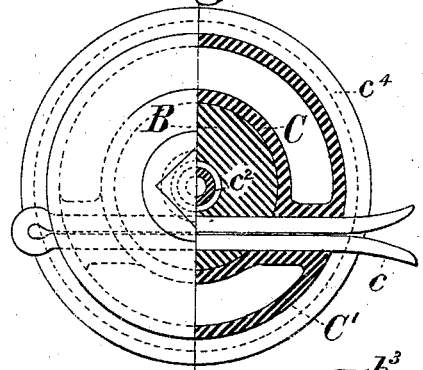
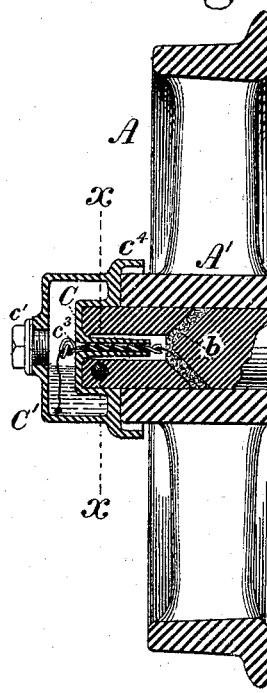
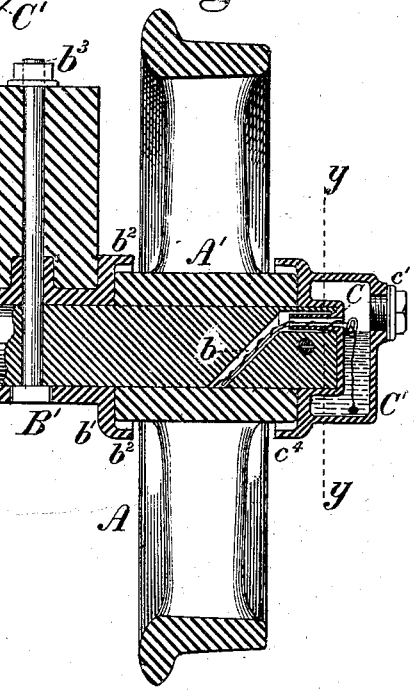
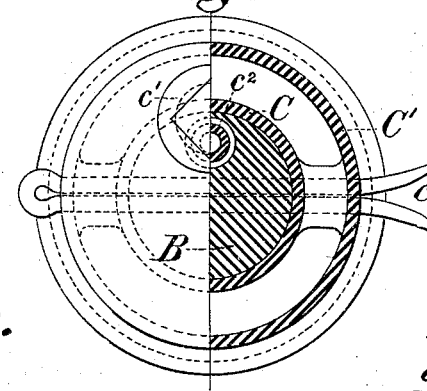
Witnesses.
Chas. W. Schuellermann.
H. S. Harding.
Inventor:
L. R. Faught,
by J. Snowden Bell,
Atty.
N. PETERS, PHOTO-LITHOGRAPHER, WASHINGTON, D. C.

UNITED STATES PATENT OFFICE.

LUTHER R. FAUGHT, OF PHILADELPHIA, PENNSYLVANIA.

IMPROVEMENT IN CAR-AXLE BOXES.

Specification forming part of Letters Patent No. 169,975, dated November 16, 1875; application filed August 27, 1875.

*To all whom it may concern:*

Be it known that I, LUTHER R. FAUGHT, of the city and county of Philadelphia, in the State of Pennsylvania, have invented certain new and useful Improvements in Lubricators for Loose Wheels, of which the following is a specification:

The object of my invention is to provide a simple and efficient device for supplying a lubricant to the hub or bearing-surface of a wheel running loosely upon its shaft or axle, such supply to be, so far as practicable, continuous, uniform, and without waste of the lubricant; to which ends my improvements consist in a novel combination of an axle-cap and oil-reservoir with oil-passages in the journal of the wheel, as hereinafter more fully set forth.

My improvements are herein described and shown as applied to railroad-car wheels, but are likewise applicable to belt-pulleys, wrist-pins, &c.

In the accompanying drawings, Figure 1 is a central section of a device for lubricating a loose car-wheel, embodying my improvements, the same being so constructed as to admit of the rotation of the axle without interfering with the operation of the lubricator; Fig. 2, a similar section of the same as constructed for use upon a stationary axle; Fig. 3, a view, half in end elevation and half in section at the line $x\,x$, and on an enlarged scale, of the device shown in Fig. 1; and Fig. 4, a view, half in end elevation and half in section at the line $y\,y$, of the device shown in Fig. 2.

To apply my improvements to the lubrication of railroad-car wheels—for example, such as are ordinarily used for mining-cars—I employ a wheel, A, of the ordinary construction, the hub A' of which is bored out to turn freely upon the axle B. The axle is supported in boxes B', having faced collars $b^1$ upon their outer ends, and may either turn freely therein, as in Fig. 1, or be confined, as by a bolt, $b^3$, passing through the center of the box and axle, or otherwise, so as to prevent the rotation of the axle, as in Fig. 2. A circular lip or flange, $b^2$, is formed upon the outer face of each collar, and surrounds the hub of the wheel without touching the same, for the purpose of excluding dirt from its bearing-surface on the axle. The wheel is held in position by an axle-cap, C, fitting easily against the outer face of the hub, and held in position by a split pin or bolt, $c$, passing through the axle. An oil-reservoir, C', preferably cylindrical, is formed upon the cap C, and is provided with an opening (closed by a screw or other plug, $c^1$,) for the introduction of the lubricant. A longitudinal recess is formed in each end of the axle, such recesses respectively communicating with one or more oil-passages, $b$, terminating on the periphery of the axle at about the center of the wheel-hub. An oil-tube, $c^2$, is formed upon or secured to the axle-cap, and projects into the recess in the axle, for the purpose of enabling a wick or cord to be led from the oil-reservoir to the oil-passages $b$.

By this arrangement I provide a closed receptacle or reservoir for the lubricant, and prevent any leakage of the same between the cap and axle.

It will be observed (see Fig. 1) that, in cases where the axle is allowed to rotate, either periodically or continuously, the oil-tube $c^2$ and plug $c^1$ must be made concentric with the axle, so that, in any position which the oil-reservoir may assume, the level of the lubricant therein will never rise above the lowest point of the tube and plug, or either of them. Two or more oil-channels should also be formed in the axle. In such cases, moreover, I find it advantageous to employ a wire, $c^3$, having an eye in its outer end, which wire I insert in the axle-recess.

The wick or cord is first attached to the inner end of the wire, and then passed out through the eye of the wire into the oil-reservoir, and may have a weight or shot upon its end therein. The wire $c^3$, turning with the axle, will maintain the wick in proper position at all times, and prevent it from kinking or winding up out of the lubricant in the reservoir.

Where the axle is always stationary, as in Fig. 2, the oil tube and plug should be placed as near as proper strength of the parts will permit to the upper line of the axle, to give as large capacity as practicable to the oil-reservoir. In such cases a single oil-passage, $b$, will be sufficient, and the wick may be attached to a wire extending to the bottom of the oil-passage.

The oil-passages are formed so as to allow of the introduction of an iron probe through the oil-chamber down to the opening at the wheel-bearing, for the purpose of clearing out obstructions that may accumulate in them.

In order to exclude dirt and dust, a circular lip or flange, $c^4$, is formed upon the inner face of the axle-cap, surrounding the end of the hub, similarly to that hereinbefore described as formed on the axle-box.

It will be seen that, by the use of my improvements, I am enabled, without necessitating any change in the ordinary wheel, to provide a receptacle for the lubricant in convenient proximity to the bearing-surfaces, and to supply the lubricant thereto with a nearly constant and uniform flow, as required, thereby preventing the heating or abrasion of the bearings, and, as evidenced by practical use, greatly economizing the quantity of lubricant required. The exclusion of dirt by the lips at each end of the hub further contributes to the durability and easy working of the parts.

I am aware that an axle-cap, serving as an oil-reservoir and communicating with oil-passages in the axle, has been heretofore known, and do not, therefore, broadly claim such device.

I claim as my invention—

The combination of the oil-reservoir $C'$ in the cap C, the recess in the axle, the tube $c^2$, the wick, and wire $c^3$, substantially as hereinbefore described and set forth.

L. R. FAUGHT.

Witnesses:
 J. SNOWDEN BELL,
 GEO. A. VAILLANT.